United States Patent [19]

Yen et al.

[11] Patent Number: 4,752,910

[45] Date of Patent: Jun. 21, 1988

[54] METHOD AND APPARATUS FOR CONTINUOUS AFTER-IMAGING

[75] Inventors: Fang-Ying Yen, Bedford; Marion A. Golin, Plainville; Howard Spilke, Shrewsbury; Jeff R. Peters, Cambridge, all of Mass.

[73] Assignee: Prime Computer, Inc., Natick, Mass.

[21] Appl. No.: 63,787

[22] Filed: Jun. 22, 1987

Related U.S. Application Data

[63] Continuation of Ser. No. 666,486, Oct. 30, 1984, abandoned.

[51] Int. Cl.$^4$ ............................................... G06F 9/00
[52] U.S. Cl. ............................................... 364/900
[58] Field of Search ............................... 364/200, 900

[56] References Cited

U.S. PATENT DOCUMENTS 4,498,145  2/1985  Baker et al. ......................... 364/900

OTHER PUBLICATIONS

DuBourdieu, D., "Implementation of Distributed Transactions," Proceedings of the 6th Berkeley Workshop on Distributed Data Management and Computer Networks, Feb. 16–18, 1982.

*Primary Examiner*—Gareth D. Shaw
*Assistant Examiner*—John G. Mills, III
*Attorney, Agent, or Firm*—Lahive & Cockfield

[57] ABSTRACT

A transactional data base processing apparatus which executes plural transactions causing a data base to be updated, incorporates an after-image recovery storage apparatus and method which enables continuous operation of the transaction system. The after-image recovery storage apparatus has a temporary storage file and a permanent storage file with circuitry for writing from the temporary storage file to the permanent storage file. Tha circuitry also writes after-image updating data records to the temporary storage file. The apparatus further includes elements for initiating transfer of the after-image data records from the temporary storage file to the permanent storage prior to a time when the temporary file is filled with the data records. The transfer is accomplished by operating the apparatus on a time shared basis so that other ongoing operations including transactional operations occur as the after-image data is being transferred to a permanent storage device.

3 Claims, 2 Drawing Sheets

METHOD AND APPARATUS FOR CONTINUOUS AFTER-IMAGING

This application is a continuation of application Ser. No. 666,486, filed 10/30/84, now abandoned.

BACKGROUND OF THE INVENTION

The invention relates generally to data base systems and in particular to multi-user concurrent transactional processing systems and methods.

It is common in a transactional system employing a data base file to create, in a local memory, a "before-image" representing each file entry as it existed before a transaction or processing update has occurred, and to further store an "after-image" representing the status of the file entry after the transaction or processing update has occurred. These images are important for recreating the contents of the file in the event that the file is destroyed, for example by a disk crash. Typically the after-images are generated and stored temporarily in a local after-image memory file until the after-image file is full. Then, a user must manually save the after-image file by storing it on a tape or disk file which will act as a permanent storage. During the save process, all other processor functions, including transactional processing, must be stopped. There results, therefore, an undesirable interruption in transaction processing which reduces efficiency and throughput in the system.

It is therefore an object of the invention to increase throughput in a data base processing apparatus and method which employs after-imaging. Another object of the invention is a high reliability data base processing system wherein permanent after-image records can be attained without interrupting the normal run processing of the system and without compromising the reliability and effectiveness of the after-imaging method and apparatus.

SUMMARY OF THE INVENTION

The invention relates to a data base processing apparatus for executing transactions which cause a data base file to be updated. The invention features an after-image recovery storage apparatus having an after-image temporary storage file and an after-image permanent storage file. Circuitry is provided for writing after-image data into the temporary storage file, and for initiating transfer of the after-image data from the temporary storage file to the permanent storage file prior to the time at which the temporary storage file becomes filled with after-image data. The transferring circuitry operates on a time-shared basis with other ongoing operations of the processing apparatus.

In a particular embodiment, the temporary storage file operates as a circular file and the transferring circuitry includes pointers for identifying the beginning of the then valid data record locations, the location at which a next data record is to be written, and a temporary storage file location at which the transfer circuitry shall initiate transfer of after-image data records from the temporary storage to the permanent storage. The transferring circuitry further includes elements for comparing the location at which a present after-image record is being written in temporary storage with the location of the write pointer. If at least part of the record is being written past the write pointer, circuitry is provided for automatically initiating transfer, on a continuous, time-shared basis, of the after-image record data in the temporary storage file.

In another aspect of the invention, there is featured a data base processing method for executing transactions which cause a data base file to be updated and in which the after-image recovery storage method writes into temporary storage the after-image update data records, and initiates transfer of the thus written data from the temporary storage to a permanent storage prior to the temporary storage file becoming filled with data. The transfer operation takes place on a time-shared basis with other ongoing operations of the processing apparatus.

The method employs pointers for identifying various locations in the temporary storage file. In particular, the storage file is organized to operate as a circular file and the transfer step provides a pointer for identifying the beginning of valid after-image data in the temporary storage file which have not yet been saved, a pointer identifying the location at which the next after-image data write operation is to occur, and a pointer identifying a temporary storage file location, related to the beginning of then valid data, at which location the transfer step can be initiated, either on an automatic or manual basis, for transferring the after-image data records from the temporary storage file to the permanent storage files.

In one aspect of the invention, the method further includes the steps of comparing the location at which a present after-image record is being written with the location of the pointer identifying when to begin saving the temporary file data and automatically initiating transfer, on a continuous time-shared basis, of the after-image data records in response to the comparison step when a record would be written, at least in part, at a location past the start save pointer Over-write at or past the save pointer location is not permitted.

BRIEF DESCRIPTION OF THE DRAWINGS

Other objects, features, and advantages of the invention will appear from the following description of a preferred embodiment taken together with the drawings in which.

DESCRIPTION OF A PREFERRED EMBODIMENT

Figure 1:
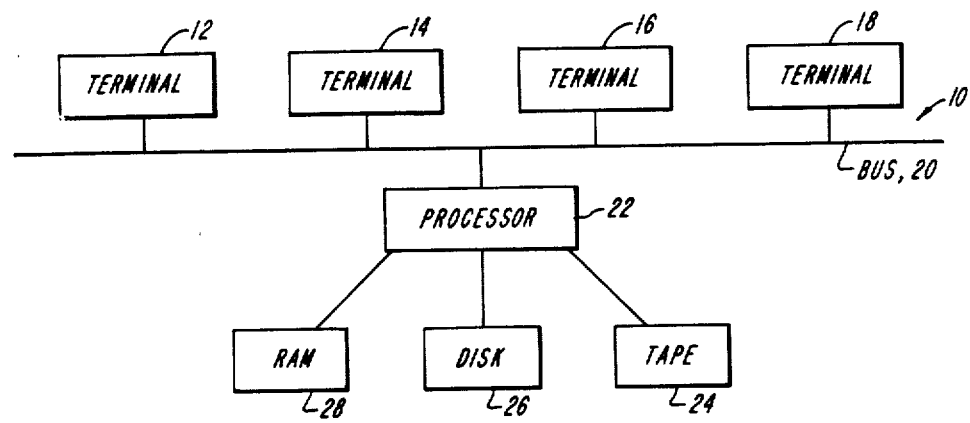
FIG. 1 is a block diagram showing a distributed data base system in which the invention is useful.

Referring to FIG. 1, the invention relates generally to data base systems such as a distributed transactional apparatus 10 having a plurality of user terminals 12, 14, 16 . . . , 18 at which a transaction can be initiated and completed. Each user terminal is connected to a communications bus 20 which can be for example a small area network, a telephone telecommunications bus, a hardwired computer bus, etc. The apparatus 10 further has connected to the bus, a main processor 22 at which data base management is controlled and through which all data flows. The processor 22 in addition to those computer peripherals typically associated with a processor such as an input console, display screens, special purpose computer peripherals, etc., further has connected thereto a tape drive memory 24, a disk drive memory 26, and a random access memory (RAM) 28.

Typically there are a number of disk drives connected to the processor 22, the disk drives containing on their recording media at least one copy of the data base which is continually being updated by transactions occurring, for example, at terminals 12, 14, 16 . . . , 18.

As noted above, the apparatus 10 provides for after-imaging of the transaction data so that if the data base were destroyed, the data files could be recreated. Thus, a permanent record of the transactions is typically recorded for example on magnetic tape for permanent storage, or at least for storage as long as is necessary.

Figure 2:
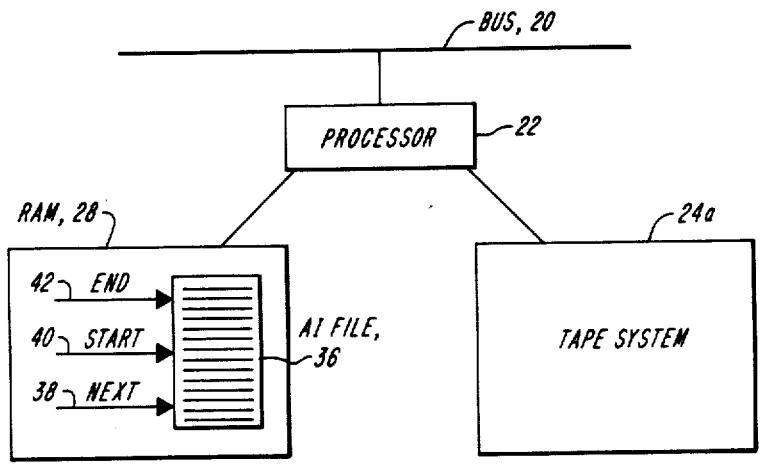
FIG. 2 is a block diagram of a continuous after-imaging system according to the invention.

Referring now to FIG. 2, in the typical central processor, there is provided in a RAM 28, an after-image file 36. The after-image file has, in the preferred embodiment of the invention, an organization which makes it circular so that both the reading and writing of after-images will wrap around to the beginning of the file when the end of file is reached. In addition, the operating system of processor 22 maintains a plurality of pointers which indicate (a) where the next after-image is to be written, a NEXT pointer 38, (b) the last position in the file that has been saved, that is, that has been transferred to permanent memory, a START pointer 40 (the operating system will not write beyond this marker) and (c) a position in the file which is a predetermined percentage of the extent of the file from the START pointer indicated position, and at which position, an automatic or manual save procedure should be initiated (an END pointer 42). A typical percentage can be twenty percent of the file.

When it is desired to save the after-image file that has been written thus far, a process can be initiated either automatically or manually. The contents of the after-image file 36 are stored, for example, on a tape system 24A which is dedicated to the continuous after-image storage program. Importantly, once initiated, the operating system of processor 22 continuously stores data from the after-image file while other transactions in the system proceed. Thus, in this time-shared system, there is no down time during which other transactions cannot occur while the after-image file is being transferred to permanent storage. This time-shared system thus operates, according to a predetermined priority scheme, to write the after-image file continuously, when time is available, onto tape without interrupting the ongoing transactional business occurring along bus 20.

Figure 3:
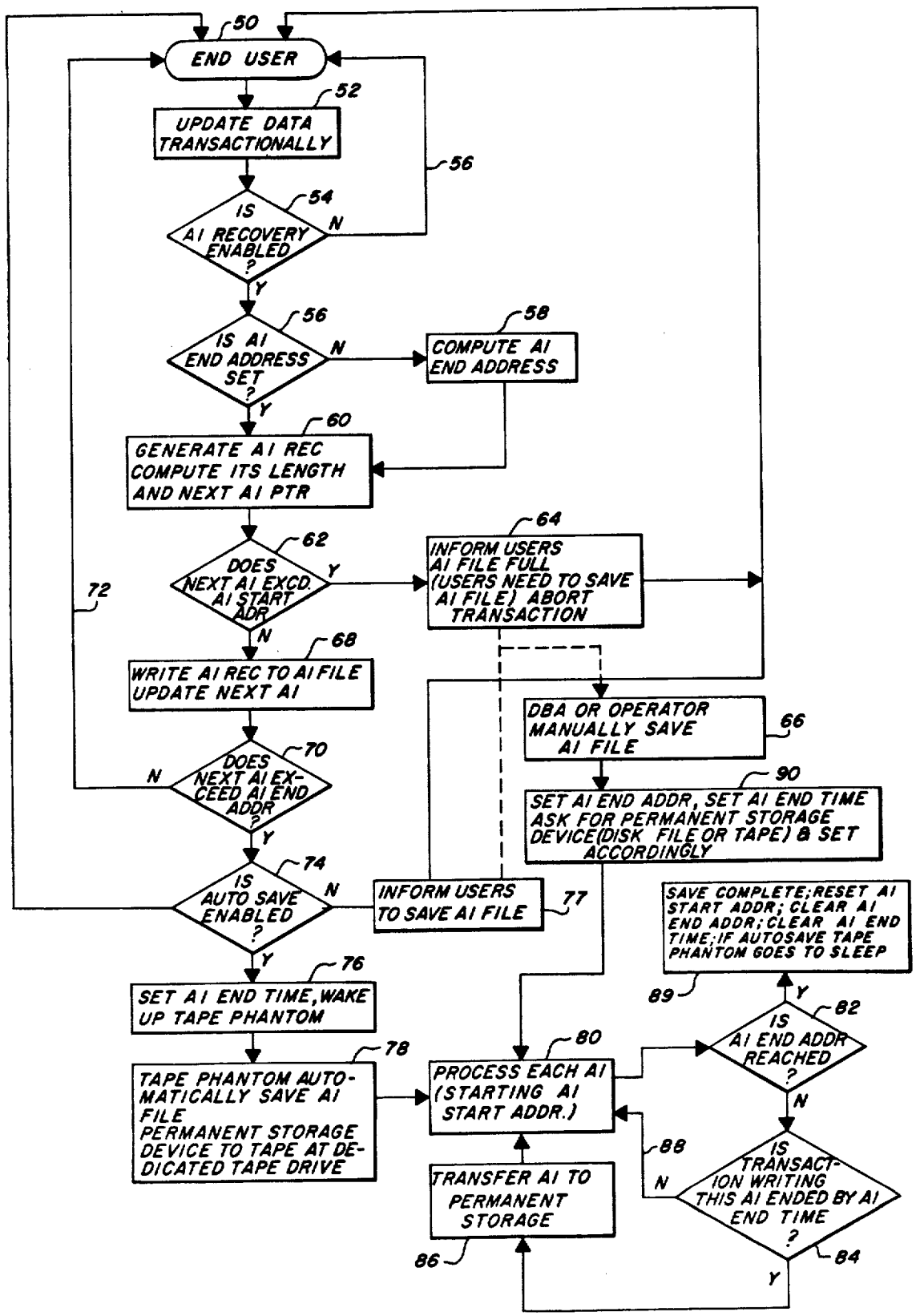
FIG. 3 is a flow chart describing operation of the apparatus in accordance with the invention.

Referring now to FIG. 3, in accordance with the invention, the system operates as follows. The end user, at 50, operating for example from the terminal 12, initiates a transaction. During the transaction, data in the files can be updated many times. The updated data can for example be stored on the data base at disk unit 26 and each data update causes an after-image record to be created and stored. Once a data update has been completed, at 52, the operating system determines, at 54, whether an after-image recovery has been enabled, and if enabled, proceeds to determine whether transfer of the after-image file is to be initiated after that data update time. If the after-image recovery is not enabled, control returns to the end user through a loop 56.

If the after-image recovery is enabled, the apparatus first checks whether the after-image END address pointer has been set. This is performed at 56. If it is not, the system generates the END address at 58, generates, at 60, the after-image record, and checks its length with the NEXT after-image pointer designating where the end of that record is. If the end of the record exceeds, at 62, the address of the beginning of the file, the START address pointer, the transaction is aborted and the user is advised that the after-image file is full and must be manually saved automatically. This is indicated at 64. Thereafter the system can return to end user manual operation at 50, and the user manually initiates the procedure to save the after-image file at 66.

If the START address has not been exceeded, the apparatus writes the after-image record in the after-image file and updates, at 68, the NEXT after-image record pointer. The apparatus then checks whether the NEXT after-image record pointer exceeds the END pointer indicating the position of the after-image file at which, transfer of the file should be automatically initiated. This is indicated at 70. If the END pointer is not exceeded, the apparatus loops back, through loop 72, to the end user control for the next transaction. If the END pointer position is exceeded by the NEXT pointer, the apparatus checks, at 74, whether an automatic save procedure has been enabled. If it has, the system not only returns control to the end user, but, operates in a time-share mode, to also store after-image data. In this mode, the system sets the after-image END time and initiates an automatic tape save mode of operation (designated "tape phantom"). This is indicated at 76. If the automatic save procedure has not been enabled, the users are advised, at 77, to save the after-image file.

In accordance with the automatic tape save mode of operation, the after-image file is saved, at 78, by storing the after-image record on a permanent storage device such as a magnetic tape medium on the tape drive 24a which is dedicated to that purpose. The save process includes processing each after-image record, starting at the START address, as indicated at 80, checking, at 82, whether the END address pointer has been reached, and if not, checking whether the transaction writing that particular after-image record has ended by the particular END time recorded above. This is indicated at 84. If the END time has not been exceeded then the after-image is transferred to permanent storage at 86, and the process repeats. If the END time has been exceeded, the after-image is not transferred and the process transfers to the "no" path 88. If the END address has been reached, the save is complete (at 89) and the apparatus resets the file parameters. In particular, the START address is reset to the present starting address and the END address is cleared, as is the END time. If the apparatus were in the automatic save mode, the tape save procedure would be disabled. This is all indicated at 89.

In the instance that the entire AI file had been written, as indicated by the YES path from decision block 62, the file is saved (typically through a manual procedure), and afterwards the after-image END address and after-image END time are set, at 90. The save process starting at 80, designating either a disk or tape storage device, is initiated.

In this manner, the after-image recording and saving process takes place continuously in a time shared mode with the main processor transactional functions. If the END address were exceeded, however, (as at 62) the apparatus would abort and otherwise terminate any ongoing transactions until the after-image file had been saved. Under this circumstance, the operation of other portions of the apparatus can be disabled.

Additions, subtractions, deletions, and other modifications of the disclosed preferred embodiment of the invention will be apparent to those skilled in the art.

What is claimed is:

1. In a distributed transaction data base processing system for concurrent data base entries for executing transactions with cause a stored data base file to be updated, including a stored data base file, a temporary storage file, and a permanent storage medium in communication with said temporary storage file a method for executing transactions which cause said stored data base file to be updated comprising the steps of:

storing on a temporary basis in an after-image temporary storage file after-image data representative of the state of data base file entries after an update has occurred;

storing in an after-image permanent storage medium associated with said after-image temporary storage file after-image data representative of the state of data base file entries after an update has occurred;

writing after-image update data into said temporary storage file;

initiating transfer of said after-image update data from said temporary storage file to said permanent storage medium prior to said temporary file becoming filled with data;

identifying with an end pointer a temporary storage file location at which said transfer step is initiated for transferring after-image update data records from the temporary storage file to the permanent storage medium;

comparing the location at which a present after-image update record is being written with the location identified by the write pointer; and automatically transferring on a continuous time-shared basis the after-image update data in the temporary storage file when the record being written is being written at lest in part in a location past the location identified by said write pointer, so that transferring occurs in an ongoing time-shared basis with other ongoing operations of said distributed transaction processing system.

2. In the method of claim 1 the further improvement comprising the steps of operating said temporary storage file in a circular file mode, identifying with a save pointer the beginning of a then valid data record file.

3. In the method of claim 1 the further improvement comprising the step of terminating a transaction in an incomplete state when the temporary storage file lacks sufficient data storage capacity to record an entire after-image record associated with said transaction without overwriting an otherwise valid after-image data record.

* * * * *